(12) United States Patent
Hsieh et al.

(10) Patent No.: US 10,382,292 B2
(45) Date of Patent: Aug. 13, 2019

(54) QUALITY ASSESSMENT AND DECISION RECOMMENDATION FOR CONTINUOUS DEPLOYMENT OF CLOUD INFRASTRUCTURE COMPONENTS

(71) Applicant: Microsoft Technology Licensing, LLC, Redmond, WA (US)

(72) Inventors: Ken Hsieh, Kirkland, WA (US); Pankaj Kumar Singh, Sammamish, WA (US); Sree Krishna Chaitanya Vadrevu, Bellevue, WA (US); Ze Li, Bellevue, WA (US); Murali Mohan Chintalapati, Bellevue, WA (US); Yingnong Dang, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 201 days.

(21) Appl. No.: 15/637,022

(22) Filed: Jun. 29, 2017

(65) Prior Publication Data
US 2019/0007282 A1   Jan. 3, 2019

(51) Int. Cl.
*H04L 12/24*  (2006.01)
*G06F 9/50*   (2006.01)
(Continued)

(52) U.S. Cl.
CPC ............ *H04L 41/5054* (2013.01); *G06F 8/60* (2013.01); *G06F 9/5077* (2013.01); *H04L 43/04* (2013.01);
(Continued)

(58) Field of Classification Search
CPC ....... G06F 8/60; H04L 41/5054; H04L 47/78; H04L 67/10; H04L 67/303; H04L 67/34
See application file for complete search history.

(56) References Cited

U.S. PATENT DOCUMENTS 7,823,147 B2    10/2010  Moshir et al.
8,014,012 B2 *   9/2011  Rodriguez ............... G06F 8/65
                                              358/1.13
(Continued)

OTHER PUBLICATIONS

Armstrong, Mark, "Using operational visibility to inform the continuous delivery cycle", https://www.ibm.com/blogs/bluemix/2015/12/operational-visibility-informs-continuous-delivery-cycle/, Dec. 9, 2015, 12 pages.
(Continued)

*Primary Examiner* — Mohamed A. Wasel
(74) *Attorney, Agent, or Firm* — Fiala & Weaver P.L.L.C.

(57) ABSTRACT

Methods, systems and computer program products are described for obtaining deployment signals comprising information relating to deployments of software components to a plurality of computing devices, obtaining fault signals comprising information relating to faults encountered by the plurality of computing devices, and obtaining device type information that describes a device type of each of the plurality of computing devices. Based on the deployment signals, fault signals, and device type information, a correlation score for each combination of software component, fault, and device type is obtained. Based on the correlation scores, attribution level decisions, fault type level decisions and device type level decisions are made. Based on these decisions, an overall decision is rendered whether to proceed or not proceed with a future deployment of the software component.

20 Claims, 9 Drawing Sheets

(51) Int. Cl.
*H04L 12/26* (2006.01)
*H04L 29/08* (2006.01)
*G06F 8/60* (2018.01)
*H04L 29/14* (2006.01)
*H04L 12/911* (2013.01)

(52) U.S. Cl.
CPC .......... *H04L 67/16* (2013.01); *H04L 67/303* (2013.01); *H04L 67/34* (2013.01); *H04L 69/40* (2013.01); *H04L 41/14* (2013.01); *H04L 47/78* (2013.01); *H04L 67/10* (2013.01)

(56) References Cited

U.S. PATENT DOCUMENTS

| | | | | |
|---|---|---|---|---|
| 8,527,222 | B1* | 9/2013 | Chen | G06Q 50/06 702/58 |
| 8,996,932 | B2 | 3/2015 | Singh et al. | |
| 2006/0080656 | A1 | 4/2006 | Cain et al. | |
| 2006/0136705 | A1* | 6/2006 | Kaimal | G06F 21/57 713/2 |
| 2006/0206430 | A1* | 9/2006 | Murata | G06F 8/61 705/51 |
| 2009/0097397 | A1* | 4/2009 | Moreira Sa de Souza | H04L 41/0636 370/216 |
| 2013/0247022 | A1* | 9/2013 | DeJana | G06F 8/65 717/172 |
| 2014/0337862 | A1 | 11/2014 | Valencia et al. | |
| 2015/0339113 | A1 | 11/2015 | Dorman et al. | |
| 2017/0060537 | A1 | 3/2017 | Mack et al. | |

OTHER PUBLICATIONS

"HP Operations Analytics: a New Analytics Platform to Support the Transformation of IT", In Enterprise Management Associates White Paper, Jun. 2013, 12 pages.

"Cloud Infrastructure Monitoring and AWS", http://www.solarwinds.com/documentation/en/flarehelp/sam/content/sam-whats-new-cloud-monitoring.htm, Retrieved on: Apr. 10, 2017, 4 pages.

* cited by examiner

400

```
┌─────────────────────────────────────────────────────────────┐
│ Calculate the correlation score for a given combination of   │
│ software component, fault and device type as a weighted sum  │
│ of time-based correlation scores for the given combination   │
│ of software component, fault and device type, wherein each   │─402
│ time-based correlation score is obtained by comparing a      │
│ number of computing devices of the device type of the given  │
│ combination that encountered the fault of the given          │
│ combination a different number of hours after deployment of  │
│ the software component of the given combination to a         │
│ baseline number of faults                                    │
└─────────────────────────────────────────────────────────────┘
```

```
┌─────────────────────────────────────────────────────────────┐
│ For each combination of fault, software component to which   │
│ the fault is attributed, and device type, render a decision  │
│ to proceed or not proceed with the future deployment of the  │─502
│ software component based on the number of computing devices  │
│ impacted by one or more faults attributed to the software    │
│ component                                                    │
└─────────────────────────────────────────────────────────────┘
                              │
                              ▼
┌─────────────────────────────────────────────────────────────┐
│ For each combination of software component to which a fault  │
│ has been attributed and device type, render a decision to    │
│ proceed or not proceed with the future deployment of the     │─504
│ software component based on whether a decision to not        │
│ proceed with the deployment was rendered for any fault       │
│ associated with the combination                              │
└─────────────────────────────────────────────────────────────┘
                              │
                              ▼
┌─────────────────────────────────────────────────────────────┐
│ For each software component to which a fault has been        │
│ attributed, render a decision to proceed or not proceed with │
│ the future deployment of the software component based on     │─506
│ whether a decision to not proceed with the future deployment │
│ was rendered for any device type associated with the         │
│ software component to which the fault has been attributed    │
└─────────────────────────────────────────────────────────────┘
```

FIG. 5

QUALITY ASSESSMENT AND DECISION RECOMMENDATION FOR CONTINUOUS DEPLOYMENT OF CLOUD INFRASTRUCTURE COMPONENTS

BACKGROUND

In a cloud infrastructure, it is often the case that many core components (e.g., operating system components, agents running in the host environments of each physical machine in the cloud, or the like) are being independently and continuously updated to fix or enhance features of the cloud infrastructure. Deploying a problematic component broadly to the cloud (e.g., updating a new build or a component to thousands or millions of computing devices) may cause a downtime of many virtual machines and could potentially lead to significant profit loss that severely impact customers. The cloud infrastructure often has a variety of configurations, both in hardware and software, and the initial impact of a failure due to a deployment may typically be hidden as the entire cloud appears to be healthy even though specific configurations may be severely impacted. In a conventional system, there may already be a wide impact radius once such a failure is detected, often days after the deployment.

There are challenges in detecting and correlating failures to specific causes in the cloud infrastructure. Failures may be caused by defects from multiple deployed components because of the highly-coupled nature of infrastructure components. There also may be multiple sources of failures, such as deployment failures, settings changes, workload, or hardware issues. Thus, failure signals may be noisy. Furthermore, the latency of failures may be varied making it difficult to pinpoint failures. Immediate failures may happen seconds or minutes after a deployment, whereas non-immediate failures may happen hours or days after the deployment.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are described for rendering a decision regarding continuous deployment of cloud infrastructure components by correlating failure events with deployment events. In particular, such correlation may provide a basis for rendering a decision as to whether to automatically stop deployment of a problematic component, and may also enable identification of the most impacted parts of the cloud infrastructure for diagnostic purposes.

Further features and advantages of the invention, as well as the structure and operation of various embodiments, are described in detail below with reference to the accompanying drawings. It is noted that the embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments and, together with the description, further explain the principles of the embodiments and to enable a person skilled in the pertinent art to make and use the embodiments.

FIG. 4 depicts a flowchart of a method of calculating a correlation score, according to embodiments.

FIG. 5 depicts a flowchart of a method of rendering a decision to proceed or not proceed with a future deployment of a software component, according to an example embodiment.

Figure 1:
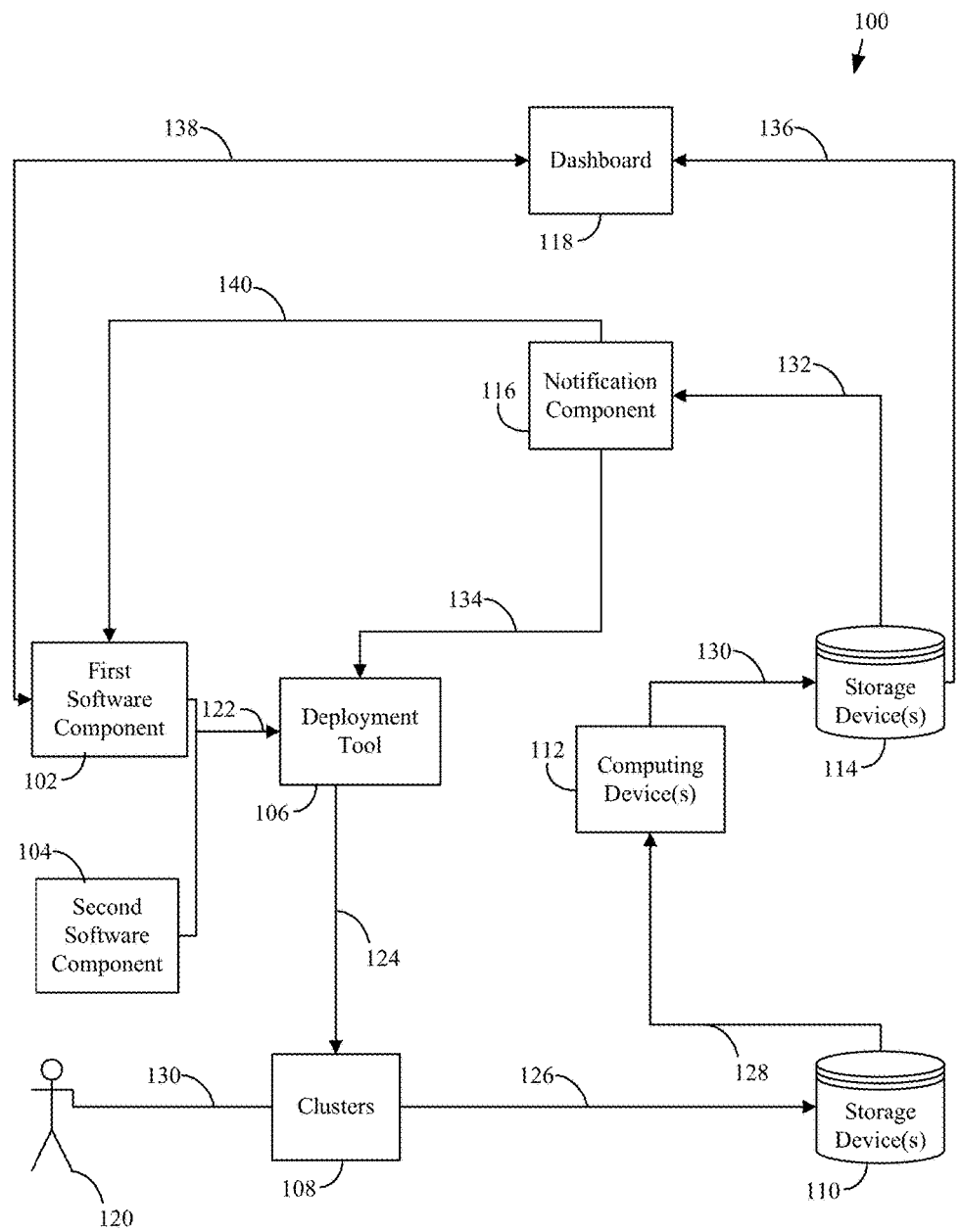
FIG. 1 is a block diagram of a system for rendering a decision to proceed or not proceed with a deployment of a software component, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

Introduction

The present specification discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Example Embodiments

In a cloud infrastructure, many components may be updated simultaneously and independently. Since the cloud infrastructure often has a variety of configurations, both in hardware and software, the initial impact of a failure due to a problematic deployment of a component may not be immediately recognized. For example, the entire cloud infrastructure may seem healthy even though some configurations may be severely impacted by the deployment of the problematic component. Thus, it is advantageous to continuously monitor the broad deployment of infrastructure components, assess the health and any changes to the cloud system during the deployment, and automatically stop the deployment of a problematic component to ensure high availability and reliability of the cloud infrastructure.

Embodiments described herein include three aspects that address the challenges of complex correlation where failures may be caused by defects from multiple components due to highly-coupled infrastructure components, noisy signals from multiple sources of failures (e.g., component deployments, settings changes, workloads, hardware issues), and variant latency that includes immediate failures and non-immediate failures. The three aspects include correlation of component deployments with failure signals, cross-component ranking and attribution, and rendering a binary decision. The correlation aspect includes correlating failure signals (e.g., failure source and signature) with deployments signals (e.g., software component identifier, version of the software component, and deployment environment). Failures are counted in multiple time windows before and after the deployment at a computing device, and both absolute count of failures and relative increase or decrease of failure count after the deployment contribute to the correlation. The cross-component ranking and attribution aspect includes formulating a correlation rank for each failure-deployment combination, and attributing a failure event to a set of deployments based on correlation rank. The aspect of rendering of a binary decision to proceed or not proceed with a future deployment of the software component includes using historical data and a regression model to map between aggregated correlated failures and deployments per failure source, and determining a decision based on the failure sources.

In an example embodiment, a method is provided. The method includes obtaining deployment signals comprising information relating to deployments of software components to a plurality of computing devices, obtaining fault signals comprising information relating to faults encountered by the plurality of computing devices, and obtaining device type information that describes a device type of each of the plurality of computing devices. Based on the deployment signals, fault signals, and device type information, a correlation score for each combination of software component, fault, and device type is obtained. Based on the correlation scores, each fault occurring on computing devices having a given device type is attributed to a particular software component having a highest correlation score. For each software component to which a fault is attributed, a decision is rendered whether to proceed or not proceed with a future deployment of the software component to additional computing devices based at least on a number of computing devices impacted by one or more faults attributed to the software component.

In another example embodiment, a system is described. The system comprises one or more processing units and one or more memory devices coupled to the one or more processing units. The one or more memory devices store program instructions for execution by the one or more processing units. The program instructions include a deployment signal collection component configured to obtain deployment signals comprising information relating to deployments of software components to a plurality of computing devices, a fault signal collection component configured to obtain fault signals comprising information relating to faults encountered by the plurality of computing devices, and a device type collection component configured to obtain device type information that describes a device type of each of the plurality of computing devices. The program instructions also include a correlation scoring component, an attribution component and a decision component. The correlation scoring component is configured to obtain a correlation score for each combination of software component, fault, and device type based on the deployment signals, fault signals, and device type information. The attribution component is configured to attribute, based on the correlation scores, each fault occurring on computing devices having a given device type to a particular software component having a highest correlation score. The decision component is configured to render a decision to proceed or not proceed with a future deployment of the software component to additional computing devices based at least on a number of computing devices impacted by one or more faults attributed to the software component for each software component to which a fault is attributed.

A computer program product is also described herein. The computer program product comprises a computer-readable storage device having computer program logic recorded thereon that when executed by a processor-based computer system causes the processor-based system to perform a method. The method comprises obtaining deployment signals comprising information relating to deployments of software components to a plurality of computing devices, obtaining fault signals comprising information relating to faults encountered by the plurality of computing devices, and obtaining device type information that describes a device type of each of the plurality of computing devices. Based on the deployment signals, fault signals, and device type information, a correlation score for each combination of software component, fault, and device type is obtained. Based on the correlation scores, each fault occurring on computing devices having a given device type is attributed to a particular software component having a highest correlation score. For each software component to which a fault is attributed, rendering a decision to proceed or not proceed with a future deployment of the software component to additional computing devices based at least on a number of computing devices impacted by one or more faults attributed to the software component.

In an example embodiment, when a decision to not proceed is rendered, any future deployment of the software component is automatically stopped based on that decision. Furthermore, information about the most severely impacted parts of the cloud infrastructure may be identified for further investigation.

Monitoring and assessing the health of a cloud infrastructure may be implemented in various manners in embodiments. For example, FIG. 1 shows a system 100 for monitoring data, including observing and/or collecting data, and assessing the health of a cloud infrastructure. As shown in FIG. 1, system 100 includes deployment tool 106, a plurality of clusters 108, one or more storage devices 110, one or more computing devices 112, one or more storage devices 114, a notification component 116, and a dashboard 118. In an example embodiment, storage devices 110 may be distributed file systems and computing device(s) 112 may be computing devices that may be shipped to the distributed file systems. These components of system 100 may be communicatively connected via one or more networks, which may comprise a local area network (LAN), a wide area network (WAN), an enterprise network, the Internet, etc., and may include one or more of wired and/or wireless portions. The components of system 100 may each be implemented as hardware or a combination of hardware and software and are described in more detail below.

Deployment tool 106 is configured to accept software components to deploy in clusters 108. The software components may be launched by developers via connection 122. The software components may include updates to fix or enhance the cloud infrastructure. FIG. 1 shows deployment tool 106 accepting first software component 102 and second software component 104, however more software components may be deployed at any given time. Deployment tool 106 may install first software component 102 and second software component 104 in one or more clusters 108 via connection 124.

Clusters 108 are configured to accept updates, such as first software component 102 and second software component 104 from deployment tool 106, and to log data about the software deployments. Clusters 108 are also configured to continuously log any faults or failures observed at clusters 108. Clusters 108 may upload data about software deployments and faults to one or more storage devices 110 via connection 126. In general, clusters 108 may comprise a group or collection of one or more computing devices (e.g. servers or nodes) that are each hosted on a network (e.g., in a cloud infrastructure or cloud-based system) to store, manage, and process data. In an embodiment, nodes may be co-located (e.g., housed in one or more nearby buildings with associated components such as backup power supplies, redundant data communications, environmental controls, etc.) to form a data center, or may be arranged in other manners. In an example embodiment, the nodes of each cluster in clusters 108 may share physical resources (e.g., power supplies, network) and/or have the same or similar structures (e.g., hardware, configurations) for ease of management. Each node may have system code that manages hardware and software, and each node may include a set of virtual machines. Additionally, there may be isolation among each of clusters 108 or groups of clusters 108 for resiliency, redundancy, and failure management purposes such that a failure in a single cluster may not impact other clusters. Accordingly, in an embodiment, clusters 108 may comprise part of one or more data centers in a distributed collection of data centers. System 100 may include any number of clusters 108, and each cluster may include any number of nodes.

Figure 2:
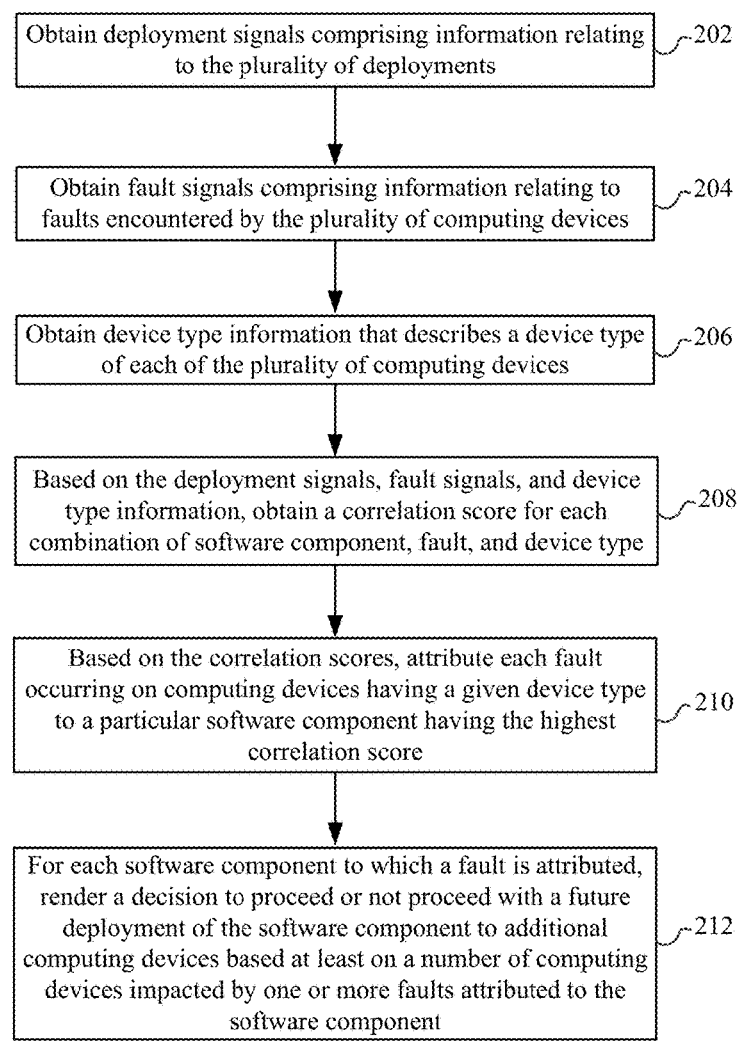
FIG. 2 depicts a flowchart of a method of rendering a decision to proceed or not proceed with a deployment of a software component, according to an example embodiment.
Figure 3:
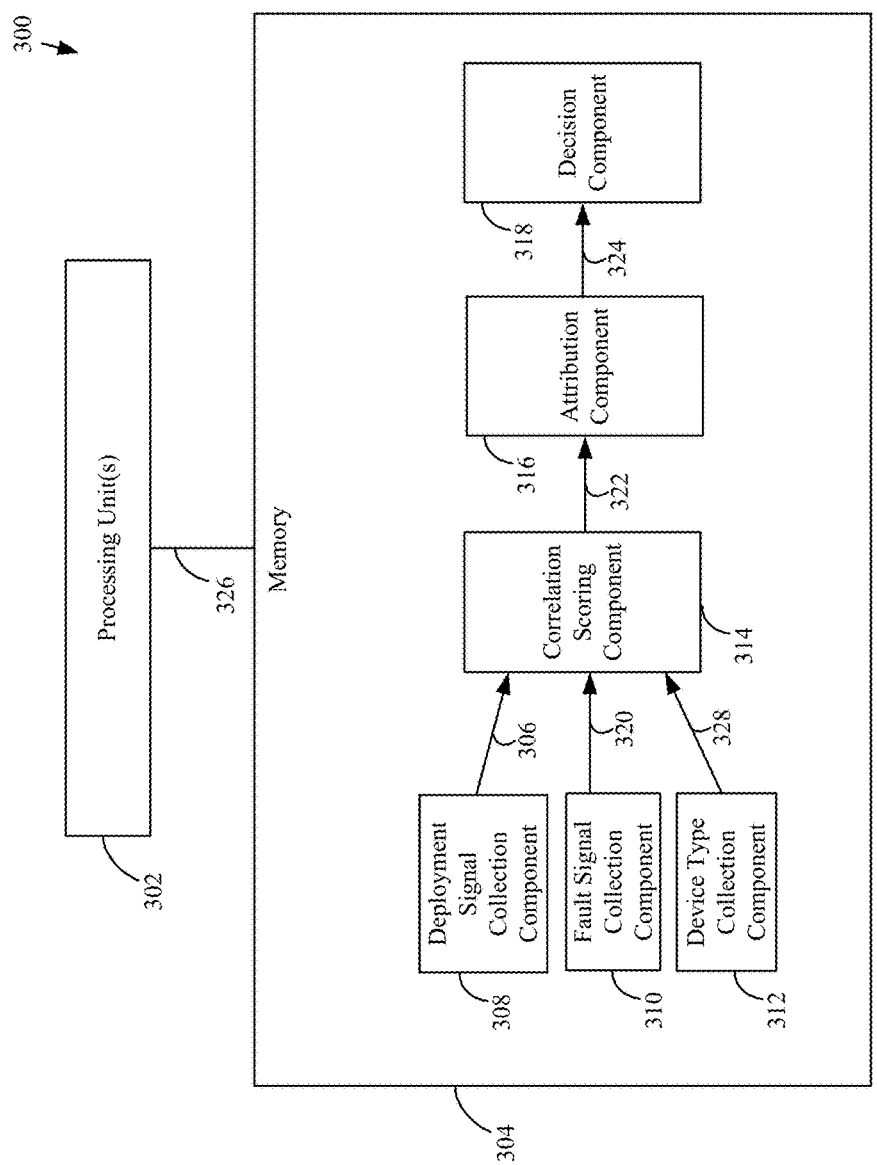
FIG. 3 is a block diagram of a computing device configured to render a decision to proceed or not proceed with a deployment of a software component, according to an example embodiment.

Computing device(s) 112 are configured to obtain data pertaining to software deployment and faults observed from storage device(s) 110 via connection 128 and to utilize that data to correlate between the software deployments and faults observed using an algorithm that will be described below in connection with FIGS. 2 and 3. The output of the algorithm is written to one or more storage devices 114 via connection 130. Computing device(s) 112 may be any type of stationary computing device, for example, any commodity hardware that may be leveraged to process big-data including a desktop computer or PC (personal computer), or a server.

Notification component 116 is configured to obtain data via connection 132 from storage device(s) 114. Such data may be a decision regarding a specific software component, such as whether to proceed with deployment of the software component to additional machines. If a software component is determined to be problematic, more data regarding the associated failure(s) may be obtained. In an example embodiment, notification component 116 may send an electronic mail (email) message via connection 140 to the appropriate team (e.g., developers associated with that specific software component, release manager) with details about the decision rendered and/or other information (e.g., information upon which the decision is based or a link to a location where such information may be provided). Notification component 116 is further configured to send a signal to deployment tool 106 via connection 134 when it identifies a problematic software component that should not be further deployed. Deployment tool 106 may automatically halt any future deployment of the problematic software component based on the received signal. This ensures that users (e.g., cloud service customers and/or end users of applications running on cloud platforms), such as user 120 shown in FIG. 1, are protected from faulty software. Thus, system 100 may reduce downtime impact for customers as they get updates in a safe manner.

Dashboard 118 is configured to obtain data via connection 136 from storage device(s) 114 and to display it on a user interface (e.g., a web user interface or a web portal). Such data may be a decision regarding a specific software component, whether to proceed with deployment of the software component to additional machines. If the software component is determined to be problematic, more data regarding the associated failure(s) may be obtained and displayed. In the above example embodiment, when the development team receives an email regarding a problematic software deployment, the team may use dashboard 118 to debug the problematic software deployment via connection 138.

Embodiments of system 100 may be implemented in various manners. For instance, FIG. 2 depicts a flowchart 200 of a method of rendering a decision to proceed or not proceed with a deployment of a software component, according to an embodiment. In an embodiment, flowchart 200 may be implemented by one or more computing devices 112 as shown in FIG. 1. For purposes of illustration, flowchart 200 of FIG. 2 is described with respect to FIG. 3. FIG. 3 shows a block diagram of a computing device 300 configured to render a decision to proceed or not proceed with a deployment of a software component, according to an example embodiment. As shown in FIG. 3, computing device 300 includes one or more processing units 302 coupled to memory 304 (which may comprise one or more memory devices) via at least one connection 326. Processing unit(s) 302 may comprise a central processing unit, a microprocessor, a multiprocessor, or other suitable processing circuitry, and is configured to load and execute program instructions stored in memory 304. The program instructions may include a deployment signal collection component 308, a fault signal collection component 310, and a device type collection component 312, a correlation scoring component 314, an attribution component 316, and a decision component 318. Computing device 300 is an example of one of computing devices 112 of FIG. 1. Flowchart 200 and computing device 300 are described as follows. Note that the steps of flowchart 200 may be performed in an order different than shown in FIG. 2 in some embodiments. Other structural and operational embodiments will be apparent to persons skilled in the relevant art(s) based on the following description.

Flowchart 200 begins with step 202. In step 202, deployment signals comprising information relating to deployments of software components to a plurality of computing devices are obtained. In an example embodiment, deployment signal collection component 308 is configured to obtain deployment signals that include data relating to the plurality of deployments. Deployment signal collection component 308 may obtain such data from storage device(s) 110, which as noted above may store data pertaining to software deployment and faults observed by clusters 108. Each deployment signal may comprise a deployment time, an identifier of a deployed software component, a version of the deployed software component, and an identifier of a computing device upon which the deployed software component was deployed. Thus, a deployment signal may be a set of records denoting that at a particular time t, a particular version v of a software component with a particular component identifier c was installed at a computing device (e.g., a node or server) with a particular device identifier n. This deployment signal may be represented as D={{t, n, c, v}, . . . }.

In step 204, fault signals comprising information relating to faults encountered by the plurality of computing devices are obtained. In an example embodiment, fault signal collection component 310 is configured to obtain fault signals that include information relating to faults encountered by the plurality of computing devices. Fault signal collection component 310 may obtain such information from storage device(s) 110, which as noted above may store data pertaining to software deployment and faults observed by clusters 108. Each fault signal may comprise a time that a computing device encountered a fault, an identifier of the computing device that encountered the fault, a type associated with the fault, and an error code associated with the fault. The type associated with the fault ("fault type") may be a broad category of failures (e.g., HostOS crash, AgentFault, ContainerFault, NodeFault, NodeReboot, VmDowntime), whereas the error code associated with the fault ("error code") provides a more granular detail of the actual failure (e.g., error code 0x00000001). Thus, a fault signal may be a set of records denoting that at a particular time t, a particular node n encountered a fault of a particular type e having a particular error code k. This fault signal may be represented as F={{t, n, e, k}, . . . }.

In step 206, device type information that describes a device type of each of the plurality of computing device is obtained. In an example embodiment, device type collection component 312 is configured to obtain device type information for each of the plurality of computing devices. Device type collection component 312 may obtain such information from storage device(s) 110, which as noted above may store data pertaining to software deployment and faults observed by clusters 108. Device type information comprises a set of attributes, wherein each attribute may be assigned a value from a corresponding set of values. Thus, device type information may include information or metadata (e.g., software, hardware, identification information, associated cluster, etc.) about a particular computing device. Each computing device (e.g., node or server) may have a set of attributes with corresponding values. For example, node n may have a first attribute a1 that is a unique identifier "stock keeping unit" having a value m1 of "GEN1" (SKU=GEN1), and a second attribute a2 of "Cluster" having a value m2 of "App01" (Cluster=App01). In this example, a permutation of the attributes of a particular computing device may be denoted as a metadata set, e.g., {GEN1}, {App01}, or {GEN1, App01}. Metadata or device type information may be represented as M={{n, m1, m2, m3, . . . }, . . . }.

Memory 304 may store other information such as model thresholds, which are a set of thresholds determined from historical data. Each threshold may be a function of an error or fault experienced by a computing device having a particular device type. For example, from historical data, a threshold of 0.5 may be determined and stored for the fault type of "HostOS crash" for a device type of GEN1 and App01, and this threshold may be denoted as: t(HostOS crash, {GEN1, App01})=0.5. As another example, when focusing on the same fault type of "HostOS crash," but only considering the device type information or attribute value of "GEN1", the threshold may be lower: t(HostOS crash, {GEN1})=0.35. Thus, the thresholds depend on how many and/or which metadata or device type information is included in the calculation of the threshold. A developer may make a determination if a software component deployment is safe by considering only hardware, or a combination of hardware and central processing unit (CPU) type, etc. In an example embodiment, the historical data and thresholds are manually selected, determined and used in the method of rendering a decision to proceed or not proceed with a deployment of a software component as will be explained below in reference to FIG. 5. In another example embodiment, the historical data may be obtained and/or continuously updated automatically without user input.

Returning to FIG. 2, in step 208, based on the deployment signals, fault signals, and device type information, a correlation score for each combination of software component, fault, and device type is obtained. In an example embodiment, correlation scoring component 314 is configured to obtain data (e.g., deployment signals, fault signals, and device type) from deployment signal collection component 308, fault signal collection component 310, and device type collection component 312 via connections 306, 320, and 328, respectively. Correlation scoring component 314 is configured to use the data to obtain a correlation score for each combination of software component, fault, and device type.

In step 210, based on the correlation scores, each fault occurring on computing devices having a given device type is attributed to a particular software component having a highest correlation score. In an example embodiment, attribution component 316 is configured to obtain data (e.g., correlation scores) from correlation scoring component via a connection 322. Attribution component is further configured to use the data to attribute each fault occurring on computing devices to a particular software component having the highest correlation score.

In step 212, for each software component to which a fault is attributed, a decision is rendered to proceed or not proceed with a future deployment of the software component to additional computing devices based at least on a number of computing devices impacted by one or more faults attributed to the software component. In an example embodiment, decision component 318 is configured to obtain data (e.g., attribution data) from attribution component 316 via a connection 324. Decision component 318 is further configured to use the data to render a binary decision, to proceed or not proceed, with a future deployment of the software component to additional computing devices (e.g., nodes, servers and/or clusters) based at least on the number of computing devices impacted by one or more faults attributed to the software component.

FIG. 4 depicts a flowchart 400 of a method for calculating a correlation score, according to embodiments. In an embodiment, the method of FIG. 4 may be used to perform step 210 of FIG. 2. At step 402, a correlation score is calculated for a given combination of software component, fault and device type as a weighted sum of time-based correlation scores for the given combination of software component, fault and device type, wherein each time-based correlation score is obtained by comparing a number of computing devices of the device type of the given combination that encountered the fault of the given combination a different number of hours after deployment of the software component of the given combination to a baseline number of faults.

In an example embodiment, a linear regression model is used to obtain the correlation score. This formula is shown below:

$$C(c, v, e, k, \{m\}) = 4P(c, v, e, k, \{m\}, 1) + 2P(c, v, e, k, \{m\}, 24) + \quad (1)$$
$$P(c, v, e, k, \{m\}, 72) + 0.5P(c, v, e, k, \{m\}, \infty)$$

where $$P(c, v, e, k, \{m\}, x) = \quad (2)$$
$$\log\left[\frac{(NF(c, v, e, k, \{m\}, x) - NF(c, v, e, k, \{m\}, -72))^2 + 1}{NF(c, v, e, k, \{m\}, -72) + 1}\right]$$

and
NF(c,v,e,k,{m},x) is the number of nodes with attributes {m} that encountered fault of type e with error code k in the x hours after (or, if x is negative, prior to) the receiving an update in component c of version v. As can be seen in the above formula (Eq. 1), each of the four different time-based correlation scores (P terms) contributes differently to the overall correlation score (C). Each time-based correlation score in the series of time-based correlation scores is weighted more heavily than the next, such that time-based correlation scores calculated for shorter time periods after deployment are weighted more heavily than time-based correlation scores for more extended time periods after deployment. In this example, the first P term that accounts for faults that occur within the first hour of the deployment has the highest contribution to the overall correlation score and is considered a strong signal. Thus, time-based correlation score for the first hour is weighted more heavily than the time-based correlation score for the first 24 hours, which is weighted more heavily than the time-based correlation score for the first 72 hours, which is weighted more heavily than the time-based correlation score for all time since deployment. Note that Eq. 1 shows four terms, but more or fewer terms may be used to determine the overall correlation score, and the values of 4, 2, 1, 0.5 are used for illustration purposes, but other values and/or weighted schemes may also be used.

In an example embodiment, the baseline number of faults includes a number of computing devices of the device type of the given combination that encountered the fault of the given combination a certain number of hours before deployment of the software component of the given combination. For example, in Eq. 2 above, the number of computing devices that faulted in the 72 hours prior to deployment is used as the baseline, although any number other than 72 hours may be used. Furthermore, as can be seen in the above formula, both absolute count of failures and relative increase or decrease of failure count after a node update contribute to the overall correlation score.

As noted above, during step 210, based on the correlation scores, each fault occurring on computing devices having a given device type is attributed to a particular software component having a highest correlation score. In an embodiment, attribution component 316, shown in FIG. 3, may obtain correlation scores from correlation scoring component 314 for each combination of {e, k, {m}}, and attribute the faults of type e with error code k occurring on nodes with the attribute set {m} to the deployment {c, v} having the highest correlation score. For example, faults attribution may be determined with the following attribution level code:

```
foreach e,k,{m}
{
    CMAX[c,k,{m}] = 0
    foreach c,v
    {
        if (C[c,v,e,k,{m}] > CMAX[c,k,{m}])
        {
            CMAX[c,k,{m}] = C[c,v,e,k,{m}]
        }
    }
    foreach c,v
    {
        if (C[c,v,e,k,{m}] = CMAX[c,k,{m}])
        {
            attr[c, v, e, k, {m}] = true
        }
        else
        {
            attr[c, v, e, k, {m}] = false
        }
    }
}
```

According to the above code, for each fault, the maximum correlation score is determined. Then for each deployment, if the associated correlation score is equal to the maximum correlation score then the fault is attributed to the deployment ("true") otherwise the fault is not attributed to the deployment ("false"). The attribution data obtained from the above code is a set of attribution values attr[c, v, e, k, {m}] for different combinations of software component, fault, and device type, c,v,e,k,{m}.

FIG. 5 depicts a flowchart 500 of a method of rendering a decision to proceed or not proceed with a future deployment of a software component based at least on a number of computing devices impacted by one or more faults attributed to the software component, according to embodiments. In an embodiment, the method of FIG. 5 may be used to perform step 212 of FIG. 2.

At step 502, for each combination of fault, software component to which the fault is attributed, and device type, a decision to proceed or not proceed with the future deployment of the software component is rendered based on the number of computing devices impacted by one or more faults attributed to the software component. In an example embodiment, decision component 318, shown in FIG. 3, may obtain attribution data from attribution component 316 and render a binary decision for every combination of software component, fault, and device type, c, e, {m}. In this example, rendering the decision to proceed or not proceed with the future deployment of the software component based on the number of computing devices impacted by one or more faults attributed to the software component comprises comparing the number of computing devices impacted to a historical threshold. For example, a decision to proceed or not to proceed may be determined with the following fault type level code:

```
foreach c, v, e, {m}
{
  nodesImpacted[c, v, e, {m}] = 0
  foreach k
  {
    if (attr[c, v, e, k, {m}] = true)
    {
      nodesImpacted[c, v, e, {m}] += (number of {m} nodes that
                suffered fault e with error code k after
                the rollout of c, v)
    }
  }
  faultTypeDecision[c,v,e,{m}] = funcFaultTypeDecision[c, v, e, {m},
                nodesImpacted[c,v,e,{m}],
                (number of {m} nodes deployed with {c, v})]
}
``` where funcFaultTypeDecision is a function that returns either returns "true" or "false". It may be implemented as shown below:

```
funcFaultTypeDecision[c,v,e,{m},nodesImpacted[c,v,e,{m}],(number
of {m} nodes deployed with {c, v})] =
if (funcCheckScope[c, v, e,{m}, nodesImpacted[c,v,e,{m}],(number
of {m} nodes deployed with {c, v})])
{
  fractionalNodesImpacted[c,v,e,{m}] = nodesImpacted[c,v,e,{m}]/
(number of {m} nodes deployed with {c, v})
  if (fractionalNodesImpacted[c,v,e,{m}] > t(e,{m}))
  {
    return true;
  }
  else
  {
    return false;
  }
}
else
{
  return false
}
``` where funcCheckScope is a function that contains domain knowledge (e.g., model thresholds) based on historical data. This function is designed to reduce chances of false positives as it determines whether the deployment has enough samples to make an accurate decision. Depending on the specific combination of device type information or metadata, $\{m\}$, the number of fractional nodes impacted may be high simply due to a small sample of the deployment, leading to false positives. Thus, this function helps prevent false positives from being identified. As a non-limiting example, a particular deployment of a software component X may be deployed to 100 nodes with 20 of them experiencing failures with different error codes, and the attribution data indicating that only 3 of the failures should be attributed to the software component. In this case, the number of nodes impacted attributed to the particular deployment is 3 out of 100, which results in a 3 percent fractional nodes impacted. The 3 percent fractional nodes impacted is then compared to a threshold for the associated fault (e.g., HostOS crash) to determine whether to proceed with a future deployment for software component X. If the fractional nodes impacted is higher than the threshold, the code above would return a "true" value and the deployment would be considered problematic and a decision of do-not-proceed will be rendered at the fault type level. In this example, a "true" value indicates that the deployment should not proceed and a "false" value indicates that the deployment should proceed.

In step 504, for each combination of software component to which a fault has been attributed and device type, a decision to proceed or not proceed with the future deployment of the software component is rendered based on whether a decision to not proceed with the deployment was rendered for any fault associated with the combination. In an embodiment, decision component 318 performs this step by combining the decisions of the faultTypeDecision[c, v, e, $\{m\}$] function from step 502 to derive a proceed or not proceed decision at a broader scope. For every combination of software component and device type, $\{c\ v, \{m\}\}$, if there is a do-not-proceed decision from any fault type e, then the decision rendered is do-not-proceed. For example, decision may be rendered using the following attribute or device type level code:

```
foreach c, v, {m}
{
  foreach e
  {
    attributeDecision[c,v,{m}] = false
    if (faultTypeDecision [c,v,e,{m}] is true)
    {
      attributeDecision[c,v,{m}] = true
    }
  }
}
```

At the end of the above code, a set of binary decisions, attributeDecision[c, v, $\{m\}$], is rendered at the device type or attribute level, with the "true" value indicating that the deployment should not proceed and the "false" value indicating that the deployment should proceed.

Returning to FIG. 5, in step 506, for each software component to which a fault has been attributed, a decision to proceed or not proceed with the future deployment of the software component is rendered based on whether a decision to not proceed with the future deployment was rendered for any device type associated with the software component to which the fault has been attributed. In an example embodiment, from the different device type level decisions, an overall decision may be rendered by decision component 318. In an example embodiment, the overall decision $\{c, v\}$ is determined from the set of binary decisions, attributeDecision[c, v, $\{m\}$] as shown in the code below:

```
foreach c, v
{
  overallDecision[c, v] = false
  foreach {m}
  {
    if (attributeDecision[c, v, {m}] is true)
    {
      overallDecision[c, v] = true
    }
  }
  return overallDecision[c, v]
}
```

A "true" value from the above code indicates a do-not-proceed decision, and a value of "false" indicates a proceed decision because the fault impact of the deployment has not exceeded any threshold and the deployment is safe enough to be broadly deployed.

In an example embodiment, when the overall decision is a do-not-proceed decision, there may be multiple reasons and/or issues why this decision was rendered. For example, the do-not-proceed decision may have been derived from two different device types or two different fault sources. In this case, by considering the various correlation scores and decisions made earlier in the process, the possible issues may be ranked in order of importance to enable the developer to quickly focus on the most critical issues. For example, a fault that impacted the highest number of nodes or the highest correlation score may be considered the most severe issue and be denoted as such. This information may be stored (e.g., in storage device(s) 114 shown in FIG. 1) for further investigation and/or for rendering on a user interface, web portal, and/or dashboard, etc.

In an embodiment, the overall decision may be determined by considering any of the decisions from an earlier stage or level (e.g., attribution level, fault type level, or device type level) and if any of these decisions is a do-not-proceed decision then the overall decision will also be a do-not-proceed decision. In another embodiment, the overall decision may take into account these decisions as well as other information, for example, data derived from domain knowledge. For instance, by using historical data regarding specific device types, quicker and/or more optimized service may be provided to those specific device types. While deployment signals, fault signals, and device type information have been discussed in example embodiments, other type of information may also be additionally included to correlate faults to software components. For example, more fault types and/or component versions may be respectively included the fault signals and deployment signals categories. As another example, other information that is not typically deemed a fault may be classified as a fault to be included in the fault signals, such as performance metrics (e.g., high central processing unit usage or high memory usage), to aid in detecting more issues earlier. In an example embodiment, not all of the deployment signals, fault signals, and device type information have to be utilized in the rendering of the overall decision. For example, faults that are linked to a particular device type may be empirically known to not correlate with software deployments. Based on this information, it may be possible to filter out these fault signals for noise/dimension reduction purposes.

Figure 6:
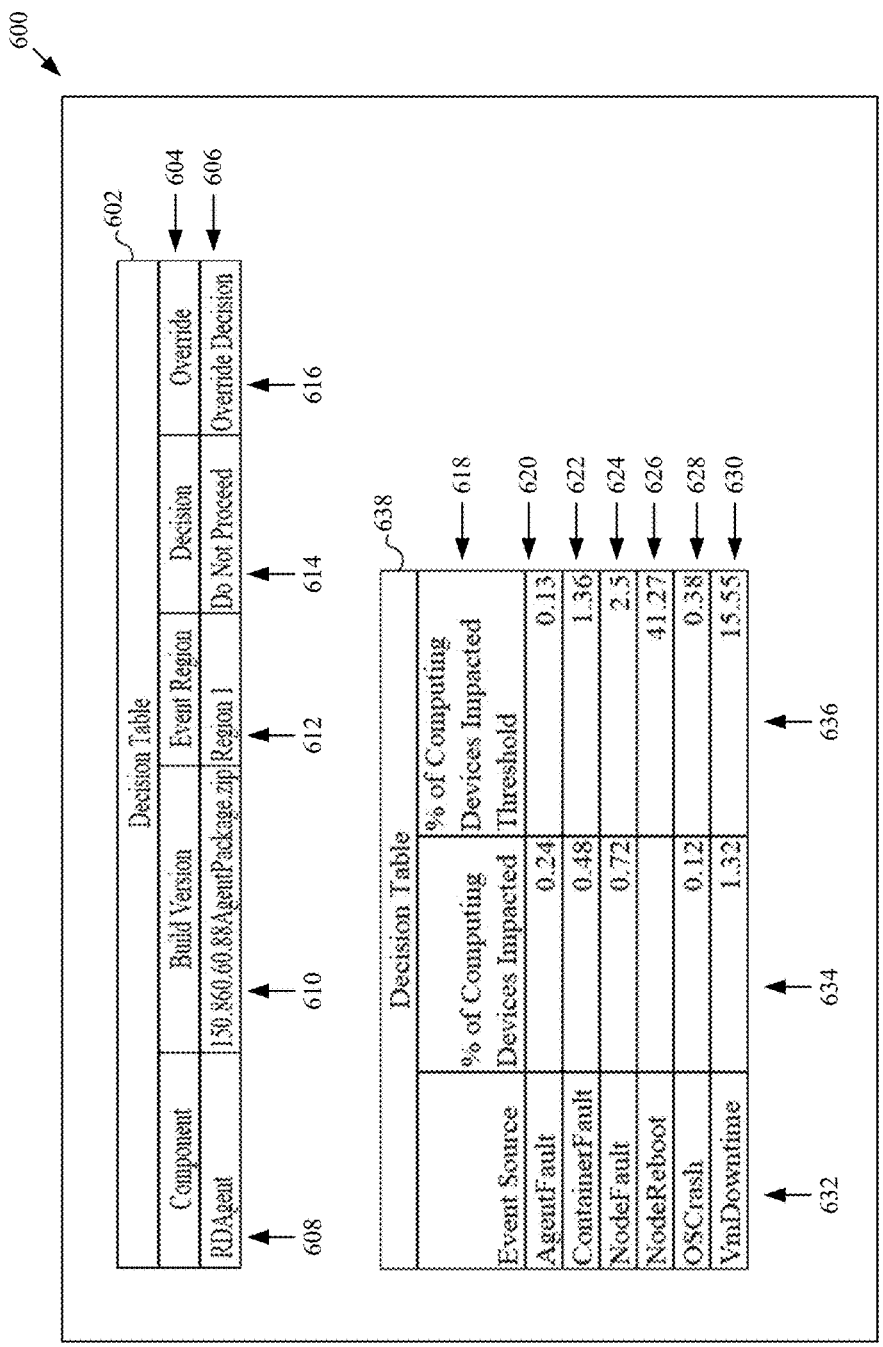
FIG. 6 depicts a portion of a notification message regarding a decision to not proceed with a future deployment of a software component, according to an example embodiment.

The overall decision and associated information may be stored (e.g., in storage device(s) 114 shown in FIG. 1) and presented to one or more users in various manners. For example, FIG. 6 depicts a portion of a notification message regarding a decision to not proceed with a future deployment of a software component, according to an embodiment. FIG. 6 depicts a portion of a notification message 600 which may be an email or an alert on some other messaging system. Notification message 600 includes a decision table 602 and a decision table 638. Notification message 600 may include data obtained from storage device(s) 110 and may be generated by notification component 116 shown in FIG. 1, for example. The information shown in notification message 600 may also be part of a report, a user interface presentation, or the like.

Decision table 602 includes a header row 604 with the headings of "Component" in column 608, "Build Version" in column 610, "Event Region" in column 612, "Decision" in column 614, and "Override" in column 616. Decision table 602 also provides specific information under each heading in subsequent rows. For example, in row 606, "RDAgent" is shown in column 608 as the software component of interest; "150.860.60.88AgentPackage.zip" is shown in column 610 as the build version for component "RDAgent"; "Region 1" is shown in column 612 as the region (e.g., location of a node or cluster, etc.) in which the event occurred; "Do Not Proceed" is shown in column 614, which is the decision that was rendered in association with software component "RDAgent"; and "Override Decision" is shown in column 616, which may be an address of a web page or a link to a user interface to enable the recipient of the notification message to override the "Do Not Proceed" decision. More or fewer rows may be provided on decision table 602 based on the amount of information that needs to be conveyed to the user.

Decision table 638 provides information about why the "Do Not Proceed" information was rendered for the software component RDAgent, including specific fault types that affected a percentage of computing devices that exceeded a predefined threshold. As shown in FIG. 6, decision table 638 includes a header row 618 with the headings of "Event Source" in column 632, "% of Computing Devices Impacted" in column 634, and "% of Computing Devices Impacted Threshold" in column 636. Decision table 638 also provides specific information under each heading in subsequent rows 620, 622, 624, 626, 628 and 630. More or fewer rows may be provided based on the available information. For example, in row 620, "AgentFault" is shown in column 632 as the source of the fault or failure event; "0.24" is shown in column 634 as the percent of computing devices impacted by "AgentFault"; and "0.13" is shown in column 636 as the percent of computing devices impacted threshold for "AgentFault." In row 622, "ContainerFault" is shown in column 634 as the event source; "0.48" is shown in column 634 as the percent of computing devices impacted by "ContainerFault"" and "1.36" is shown in column 636 as the percent of computing devices impacted threshold for "ContainerFault." In row 624, "NodeFault" is shown in column 632 as the event source, "0.72" is shown in column 634 as the percent of computing devices impacted by "NodeFault"" and "2.5" is shown in column 636 as the percent of computing devices impacted threshold for "NodeFault." In row 626, "NodeReboot" is shown in column 632 as the event source; a blank is shown in column 634 for the percent of computing devices impacted by "NodeReboot" since the data is not available or not applicable; and "41.27" is shown in column 636 as the percent of computing devices impacted threshold for "NodeReboot." In row 628, "OSCrash" is shown in column 632 as the event source, "0.12" is shown in column 634 for the percent of computing devices impacted by "OSCrash"; and "0.38" is shown in column 636 as the percent of computing devices impacted threshold for "OSCrash." In row 630, "VmDowntime" is shown in column 632 as the event source; "1.32" is shown in column 634 for the percent of computing devices impacted by "VmDowntime"; and "15.55" is shown in column 636 as the percent of computing devices impacted threshold for "VmDowntime."

While not shown in FIG. 6, notification message 600 may include a link (e.g., uniform resource identifier) to direct a user to a user interface or web portal (e.g., dashboard 118 shown in FIG. 1) that provides more detailed information that may be too lengthy to be included in notification message 600. Such user interface or web portal may include more current information than provided in notification message 600.

Figure 7:
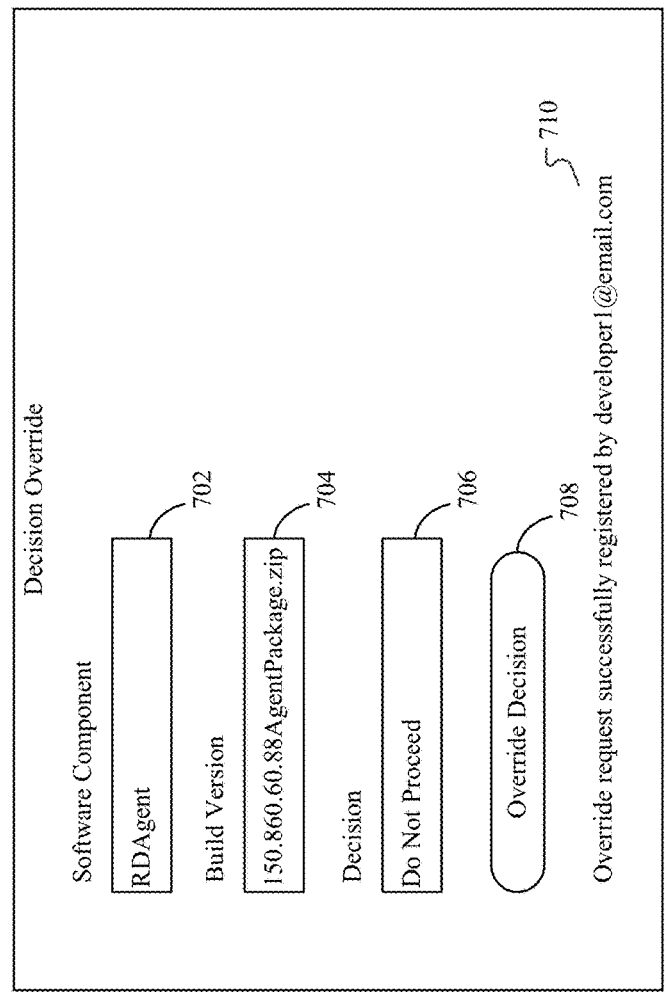
FIG. 7 depicts a user interface, according to an example embodiment.

The decision override may be implemented in various manner. For example, FIG. 7 depicts a user interface 700 that accepts a user input to override a decision to not proceed with a future deployment of a software component, according to an embodiment. User interface 700 may include field 704 to be populated with a particular software component (e.g., "RDAgent"); field 706 to be populated with the build version (e.g., "150.860.60.88AgentPackage.zip") associated with the software component; field 708 to be populated with the decision rendered ("Do Not Proceed") (e.g., by decision component 318 shown in FIG. 3), and link and/or button 710 to facilitate the override. Once a user activates the override option by clicking on button 710, user interface 700 may display an acknowledgement message to confirm the override as well as logging user information (e.g., email address) of the user who performed the override (e.g., "Override request successfully registered by developer1@email.com").

Figure 8:
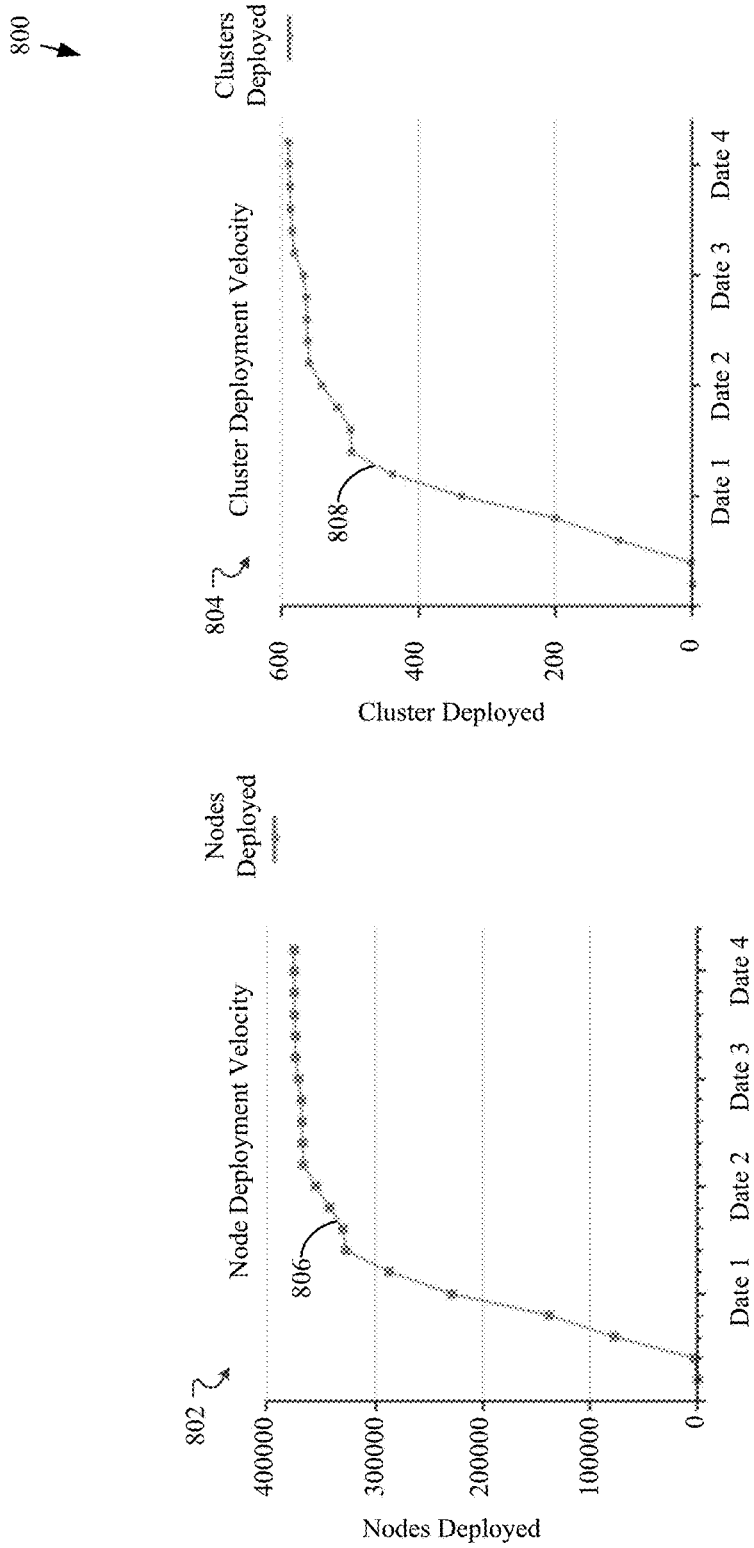
FIG. 8 depicts a portion of a user interface that provides information regarding deployments of software components, according to an example embodiment.

Once a user receives a notification (e.g., notification message 600) regarding a deployment, the user may find more information via a user interface or web portal (e.g., dashboard 118 shown in FIG. 1). For example, FIG. 8 depicts a portion of a user interface 800 that provides information regarding a deployment of a software component, according to an embodiment. User interface 800 includes a line chart 802 that depicts the node deployment velocity. As shown in chart 802, the y-axis shows the number of nodes deployed with the software component having a scale of 0 to 400,000, and the x-axis shows the dates for the deployments. Line 806 on chart 802 shows the number of nodes deployed with the software component over the course of four days, reaching a count of 375,053 nodes. User interface 800 further includes a line chart 804 that depicts the cluster deployment velocity. As shown in chart 804, the y-axis shows the number of cluster deployed with the software component with a scale of 0 to 600, and the x-axis shows the dates for the deployments. Line 808 on chart 804 shows the number of clusters deployed with the software component over the course of four days, reaching a count of 591 nodes.

Figure 9:
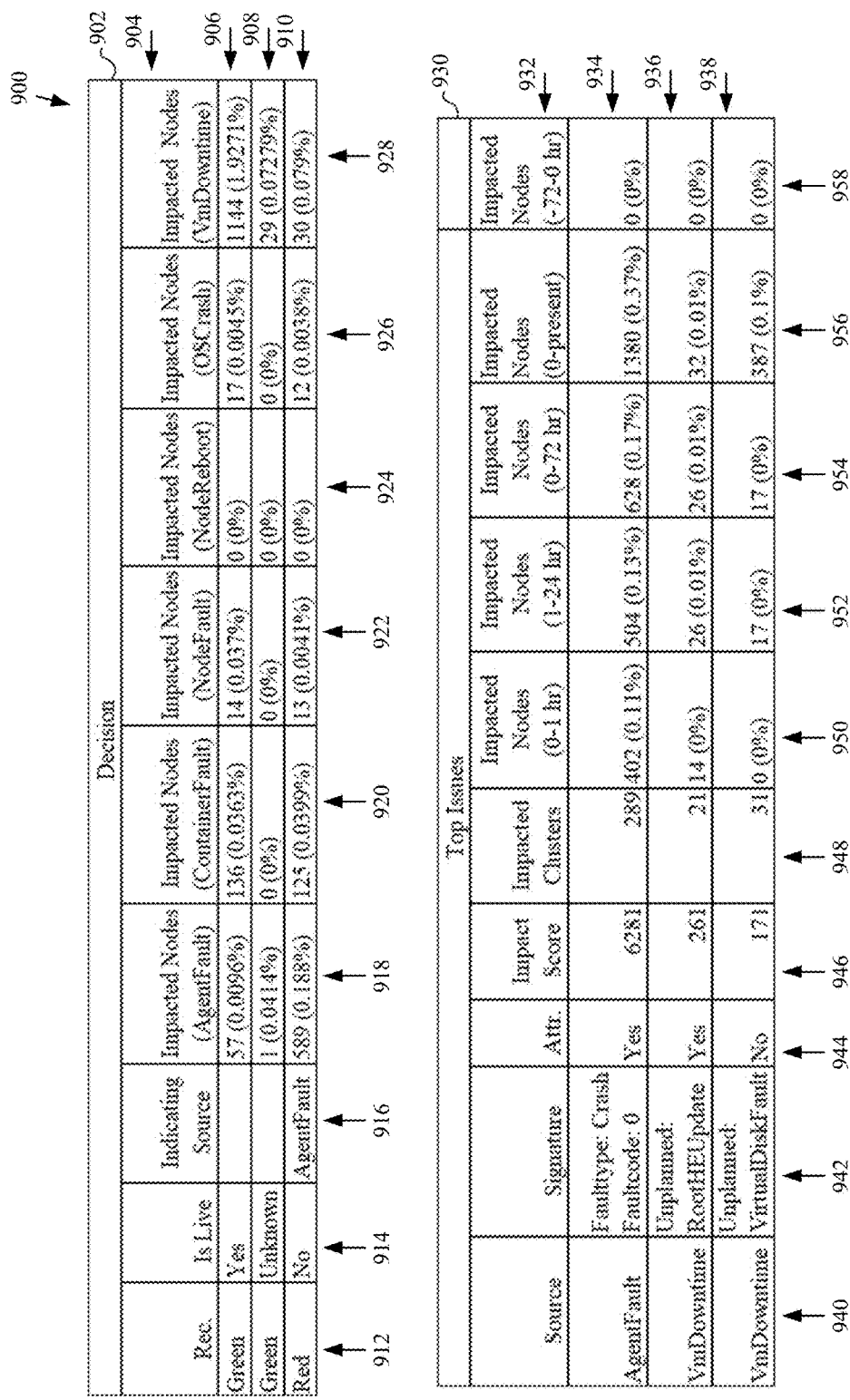
FIG. 9 depicts a portion of a user interface that provides information regarding decisions to proceed or not proceed with a future deployment of a software component and corresponding issues, according to an example embodiment.

More information regarding the software component deployment may be provided on a different user interface or a different portion of user interface 800. For example, FIG. 9 depicts a portion of a user interface 900 that provides information regarding decisions to proceed or not proceed with a future deployment of the software component depicted in charts 802 and 804, according to an embodiment. User interface 900 may be a continuation of user interface 800 or may be a different user interface.

User interface 900 includes decision table 902, which includes a header row 904 with headings "Rec." in column 912 which provides recommendations that may be color coded for easy recognition; "Is Live" in column 914 which indicates whether a cluster is serving real customer workload, if so the cluster may be deprecated to allow decision table 902 to be updated with live clusters; "Indicating Source" in column 916 which indicates the fault type; "Impacted Nodes (AgentFault)" in column 918 which indicates the computing devices impacted with "AgentFault"; "Impacted Nodes (NodesFault)" in column 920 which indicates the computing devices impacted with "NodesFault"; "Impacted Nodes (NodeReboot)" in column 924 which indicates the computing devices impacted with "NodeReboot"; "Impacted Nodes (OSCrash)" which indicates the computing devices impacted with "OSCrash"; and "Impacted Nodes (VmDowntime)" which indicates the computing devices impacted with "VmDowntime." Rows 906, 908, and 910 of decision table 902 present specific information under each heading. For example, row 906 presents a "Green" proceed recommendation for a particular cluster that is "Live" with no applicable "Indicating Source" having 57 nodes impacted with "AgentFault", 136 nodes impacted with "ContainerFault", 14 nodes impacted with "NodeFault", 0 node impacted with "NodeReboot", 17 nodes impacted with "OSCrash", and 1144 nodes impacted with "VmDowntime." Row 908 presents a "Green" proceed recommendation for a particular cluster with an "Unknown" status, with no applicable "Indicating Source" having 1 node impacted with "AgentFault", 0 node impacted with "ContainerFault", 0 node impacted with "NodeFault", 0 node impacted with "NodeReboot", 0 node impacted with "OSCrash", and 29 nodes impacted with "VmDowntime." Row 910 presents a "Red" do-not-proceed recommendation for a particular cluster that is not "Live", with "AgentFault" as the "Indicating Source" having 589 nodes impacted with "AgentFault", 125 nodes impacted with "ContainerFault", 13 nodes impacted with "NodeFault", 0 node impacted with "NodeReboot", 12 nodes impacted with "OSCrash", and 30 nodes impacted with "VmDowntime."

User interface 900 further includes top issues table 930 that depicts the top issues with the software component deployment. Top issues table 903 has a header row 932 with headings "Source" in column 940 that indicates fault sources, "Signature" in column 942 that indicates the fault type and error code; "Attr" in column 944 that indicates whether the fault source is attributed to the deployment of the software component, where "yes" means the issue is highly correlated the deployment and "no" means the issue is not likely correlated to this deployment because it happened both before and after the deployment; "Impact Score" in column 946 that indicates a measure of impact, "Impacted Clusters" indicates the number of clusters impacted, "Impacted Nodes (0-1 hr)" indicates the number of nodes impacted during the first hour of the software component deployment; "Impacted Nodes (1-24 hr)" indicates the number of nodes impacted during the day of the software component deployment; "Impacted Nodes (0-72 hr)" indicates the number of nodes impacted during the first 3 days of the software component deployment; "Impacted Nodes (0-present) indicates the number of nodes impacted since the deployment; and "Impacted Nodes (−72-0 hr)" indicates the number of nodes impacted during the 3 days before the deployment. Row 934 shows "AgentFault" in column 940 as the fault source, "Faulttype: Crash; Faultcode: 0" in column 942 as the "Signature"; "Yes" in column 944 indicating that "AgentFault" is attributed to this deployment; "6281" shown in column 946 as the impact score; "289" is shown in column 948 as the number of impacted clusters. As further shown in row 934, the "AgentFault" fault impacted 402 nodes during the first hour, 504 nodes during the first day, 628 nodes during the first 3 days, and 1380 total nodes since the deployment while having no impact on any node prior to the deployment. Row 936 shows "VmDowntime" in column 940 as the fault source, "Unplanned:RootHEUpdate" in column 942 as the "Signature"; "Yes" in column 944 indicating that "VmDowntime" with the fault code of "Unplanned:RootHEUpdate" is attributed to this deployment; "261" shown in column 946 as the impact score; "21" is shown in column 948 as the number of impacted clusters. As further shown in row 936, the "Unplanned:RootHEUpdate" fault code impacted 14 nodes during the first hour, 26 nodes during the first day, 26 nodes during the first 3 days, and 26 total nodes since the deployment while having no impact on any node prior to the deployment. Row 938 shows "VmDowntime" in column 940 as the fault source, "Unplanned: VirtualDiskFault" in column 942 as the "Signature"; "No" in column 944 indicating that "VmDowntime" with the fault code of "Unplanned: VirtualDiskFault" is not attributed to this deployment; "171" shown in column 946 as the impact score; "31" is shown in column 948 as the number of impacted clusters. As further shown in row 938, the "Unplanned:VirtualDiskFault" fault code impacted 0 nodes during the first hour, 17 nodes during the first day, 17 nodes during the first 3 days, and 387 total nodes since the deployment while having no impact on any node prior to the deployment.

Example Computer System Implementations

Deployment tool 106, clusters 108, storage device(s) 110, computing device(s) 112, storage device(s) 114, notification component 116, dashboard 118, processing unit(s) 302, memory 304, flowchart 200, flowchart 400, and/or flowchart 500 may be implemented in hardware, or hardware with any combination of software and/or firmware, including being implemented as computer program code executed in one or more processors and/or stored in a computer readable storage medium, or being implemented as hardware logic/electrical circuitry, such as being implemented together in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 10:
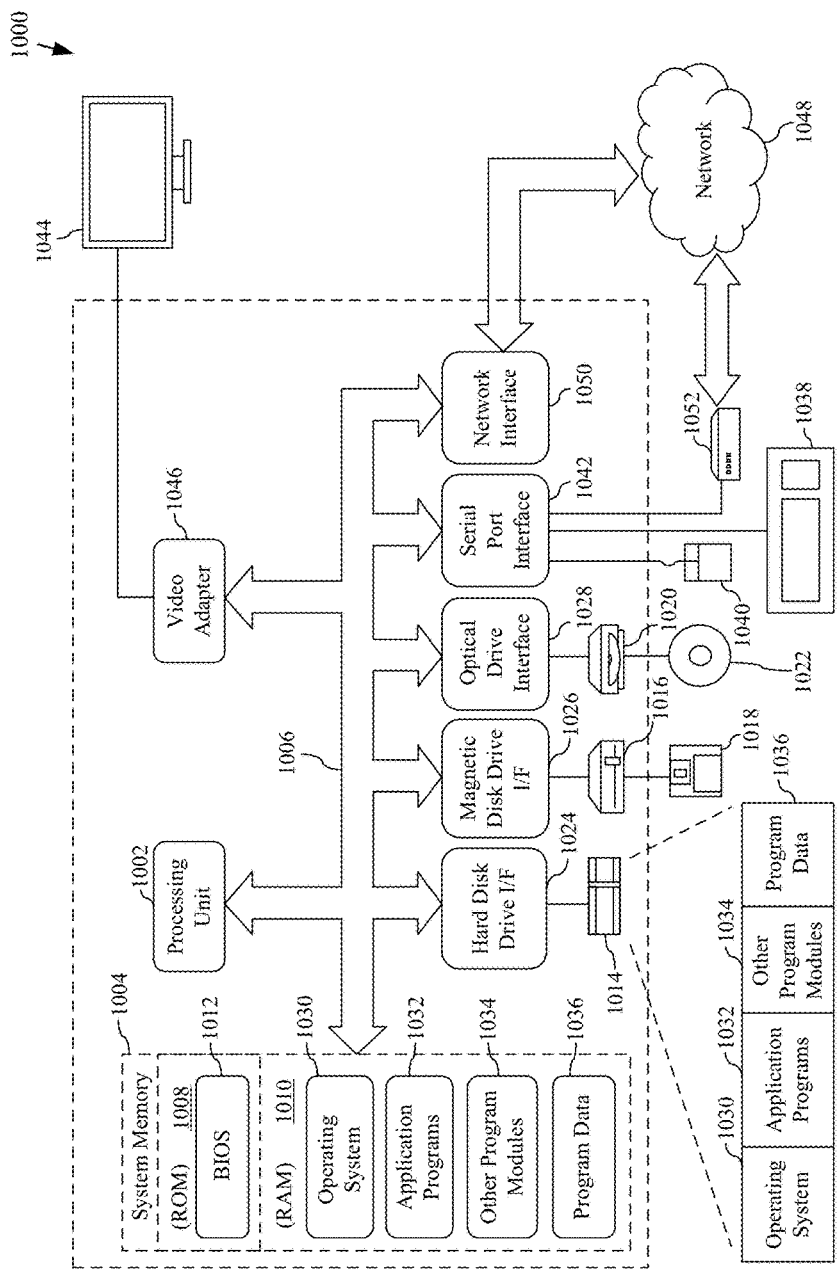
FIG. 10 is a block diagram of a computing system, according to an example embodiment.

FIG. 10 depicts an example processor-based computer system 1000 that may be used to implement various embodiments described herein. For example, system 1000 may be used to implement deployment tool 106, clusters 108, storage device(s) 110, computing device(s) 112, storage device(s) 114, notification component 116, dashboard 118, processing unit(s) 302, and memory 304 as described above. The description of system 1000 provided herein is provided for purposes of illustration, and is not intended to be limiting. Embodiments may be implemented in further types of computer systems, as would be known to persons skilled in the relevant art(s).

As shown in FIG. 10, system 1000 includes a processing unit 1002, a system memory 1004, and a bus 1006 that couples various system components including system memory 1004 to processing unit 1002. Processing unit 1002 may comprise one or more circuits, microprocessors or microprocessor cores. Bus 1006 represents one or more of any of several types of bus structures, including a memory bus or memory controller, a peripheral bus, an accelerated graphics port, and a processor or local bus using any of a variety of bus architectures. System memory 1004 includes read only memory (ROM) 908 and random access memory (RAM) 1010. A basic input/output system 1012 (BIOS) is stored in ROM 1008.

System 1000 also has one or more of the following drives: a hard disk drive 1014 for reading from and writing to a hard disk, a magnetic disk drive 1016 for reading from or writing to a removable magnetic disk 1018, and an optical disk drive 1020 for reading from or writing to a removable optical disk 1022 such as a CD ROM, DVD ROM, BLU-RAY™ disk or other optical media. Hard disk drive 1014, magnetic disk drive 1016, and optical disk drive 1020 are connected to bus 1006 by a hard disk drive interface 1024, a magnetic disk drive interface 1026, and an optical drive interface 1028, respectively. The drives and their associated computer-readable media provide nonvolatile storage of computer-readable instructions, data structures, program modules and other data for the computer. Although a hard disk, a removable magnetic disk and a removable optical disk are described, other types of computer-readable memory devices and storage structures can be used to store data, such as flash memory cards, digital video disks, random access memories (RAMs), read only memories (ROM), and the like.

A number of program modules may be stored on the hard disk, magnetic disk, optical disk, ROM, or RAM. These program modules include an operating system 1030, one or more application programs 1032, other program modules 1034, and program data 1036. In accordance with various embodiments, the program modules may include computer program logic that is executable by processing unit 1002 to perform any or all of the functions and features of deployment tool 106, clusters 108, storage device(s) 110, computing device(s) 112, storage device(s) 114, notification component 116, dashboard 118, processing unit(s) 302, memory 304, flowchart 200, flowchart 400, and/or flowchart 500 (including any step of flowcharts 200, 400, and 500).

A user may enter commands and information into system 1000 through input devices such as a keyboard 1038 and a pointing device 1040 (e.g., a mouse). Other input devices (not shown) may include a microphone, joystick, game controller, scanner, or the like. In one embodiment, a touch screen is provided in conjunction with a display 1044 to allow a user to provide user input via the application of a touch (as by a finger or stylus for example) to one or more points on the touch screen. These and other input devices are often connected to processing unit 1002 through a serial port interface 1042 that is coupled to bus 1006, but may be connected by other interfaces, such as a parallel port, game port, or a universal serial bus (USB). Such interfaces may be wired or wireless interfaces.

Display 1044 is connected to bus 1006 via an interface, such as a video adapter 1046. In addition to display 1044, system 1000 may include other peripheral output devices (not shown) such as speakers and printers.

System 1000 is connected to a network 1048 (e.g., a local area network or wide area network such as the Internet) through a network interface 1050, a modem 1052, or other suitable means for establishing communications over the network. Modem 1052, which may be internal or external, is connected to bus 1006 via serial port interface 1042.

As used herein, the terms "computer program medium," "computer-readable medium," and "computer-readable storage medium" are used to refer to physical hardware media such as the hard disk associated with hard disk drive 1014, removable magnetic disk 1018, removable optical disk 1022, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1032 and other programs 1034) may be stored on the hard disk, magnetic disk, optical disk, ROM, RAM, or other hardware storage medium. Such computer programs may also be received via network interface 1050, serial port interface 1042, or any other interface type. Such computer programs, when executed or loaded by an application, enable computing device 1000 to implement features of embodiments discussed herein. Accordingly, such computer programs represent controllers of the computing device 1000.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

Additional Example Embodiments

In an embodiment, a method comprises: obtaining deployment signals comprising information relating to deployments of software components to a plurality of computing devices; obtaining fault signals comprising information relating to faults encountered by the plurality of computing devices; obtaining device type information that describes a device type of each of the plurality of computing devices; based on the deployment signals, fault signals, and device type information, obtaining a correlation score for each combination of software component, fault, and device type; based on the correlation scores, attributing each fault occurring on computing devices having a given device type to a particular software component having a highest correlation score; and for each software component to which a fault is attributed, rendering a decision to proceed or not proceed with a future deployment of the software component to additional computing devices based at least on a number of computing devices impacted by one or more faults attributed to the software component.

In an embodiment, each deployment signal comprises a deployment time, an identifier of a deployed software component, a version of the deployed software component, and an identifier of a computing device upon which the deployed software component was deployed; each fault signal comprises a time that a computing device encountered a fault, an identifier of the computing device that encountered the fault, a type associated with the fault, and an error code associated with the fault; and the device type information comprises a set of attributes, wherein each attribute may be assigned a value from a corresponding set of values.

In an embodiment, the correlation score for a given combination of software component, fault and device type is calculated as a weighted sum of time-based correlation scores for the given combination of software component, fault and device type, wherein each time-based correlation score is obtained by comparing a number of computing devices of the device type of the given combination that encountered the fault of the given combination a different number of hours after deployment of the software component of the given combination to a baseline number of faults.

In an embodiment, a first time-based correlation score of the time-based correlation scores calculated for a first number of hours after deployment of the software component is weighted more heavily than a second time-based correlation score of the time-based correlation scores calculated for a second number of hours after deployment of the software component, the first number of hours being less than the second number of hours.

In an embodiment, the baseline number of faults comprises a number of computing devices of the device type of the given combination that encountered the fault of the given combination a certain number of hours before deployment of the software component of the given combination.

In an embodiment, the rendering of a decision to proceed or not proceed with a future deployment of the software component to additional computing devices comprises: for each combination of fault, software component to which the fault is attributed, and device type, rendering a decision to proceed or not proceed with the future deployment of the software component based on the number of computing devices impacted by one or more faults attributed to the software component; for each combination of software component to which a fault has been attributed and device type, rendering a decision to proceed or not proceed with the future deployment of the software component based on whether a decision to not proceed with the deployment was rendered for any fault associated with the combination; and for each software component to which a fault has been attributed, rendering a decision to proceed or not proceed with the future deployment of the software component based on whether a decision to not proceed with the future deployment was rendered for any device type associated with the software component to which the fault has been attributed.

In an embodiment, the rendering the decision to proceed or not proceed with the future deployment of the software component based on the number of computing devices impacted by one or more faults attributed to the software component comprises comparing the number of computing devices impacted to a historical threshold.

In another embodiment, a system comprises: one or more processing units; and one or more memory devices coupled to the one or more processing units, the one or more memory devices storing program instructions for execution by the one or more processing units, the program instructions including: a deployment signal collection component configured to obtain deployment signals comprising information relating to deployments of software components to a plurality of computing devices; a fault signal collection component configured to obtain fault signals comprising information relating to faults encountered by the plurality of computing devices; a device type collection component configured to obtain device type information that describes a device type of each of the plurality of computing devices; a correlation scoring component configured to obtain a correlation score for each combination of software component, fault, and device type based on the deployment signals, fault signals, and device type information; an attribution component configured to attribute, based on the correlation scores, each fault occurring on computing devices having a given device type to a particular software component having a highest correlation score; and a decision component configured to render a decision to proceed or not proceed with a future deployment of the software component to additional computing devices based at least on a number of computing devices impacted by one or more faults attributed to the software component for each software component to which a fault is attributed.

In an embodiment, each deployment signal comprises a deployment time, an identifier of a deployed software component, a version of the deployed software component, and an identifier of a computing device upon which the deployed software component was deployed; each fault signal comprises a time that a computing device encountered a fault, an identifier of the computing device that encountered the fault, a type associated with the fault, and an error code associated with the fault; and the device type information comprises a set of attributes, wherein each attribute may be assigned a value from a corresponding set of values.

In an embodiment, the correlation scoring component is configured to obtain a correlation score for a given combination of software component, fault and device type by calculating a weighted sum of time-based correlation scores for the given combination of software component, fault and device type, wherein each time-based correlation score is obtained by comparing a number of computing devices of the device type of the given combination that encountered the fault of the given combination a different number of hours after deployment of the software component of the given combination to a baseline number of faults.

In an embodiment, a first time-based correlation score of the time-based correlation scores calculated for a first number of hours after deployment of the software component is weighted more heavily than a second time-based correlation score of the time-based correlation scores calculated for a second number of hours after deployment of the software component, the first number of hours being less than the second number of hours.

In an embodiment, the baseline number of faults comprises a number of computing devices of the device type of the given combination that encountered the fault of the given combination a certain number of hours before deployment of the software component of the given combination.

In an embodiment, the decision component is configured to render the decision to proceed or not proceed with the future deployment of the software component by: for each combination of fault, software component to which the fault is attributed, and device type, rendering a decision to proceed or not proceed with the future deployment of the software component based on the number of computing devices impacted by one or more faults attributed to the software component; for each combination of software component to which a fault has been attributed and device type, rendering a decision to proceed or not proceed with the future deployment of the software component based on whether a decision to not proceed with the deployment was rendered for any fault associated with the combination; and for each software component to which a fault has been attributed, rendering a decision to proceed or not proceed with the future deployment of the software component based on whether a decision to not proceed with the future deployment was rendered for any device type associated with the software component to which the fault has been attributed.

In another embodiment, a computer program product comprising a computer-readable storage device having computer program logic recorded thereon that when executed by a processor-based computer system causes the processor-based system to perform a method, the method comprises: obtaining deployment signals comprising information relating to the deployments of software components to a plurality of computing devices; obtaining fault signals comprising information relating to faults encountered by the plurality of computing devices; obtaining device type information that describes a device type of each of the plurality of computing devices; based on the deployment signals, fault signals, and device type information obtaining a correlation score for each combination of software component, fault, and device type; based on the correlation scores, attributing each fault occurring on computing devices having a given device type to a particular software component having a highest correlation score; and for each software component to which a fault is attributed, rendering a decision to proceed or not proceed with a future deployment of the software component to additional computing devices based at least on a number of computing devices impacted by one or more faults attributed to the software component.

In an embodiment, each deployment signal comprises a deployment time, an identifier of a deployed software component, a version of the deployed software component, and an identifier of a computing device upon which the deployed software component was deployed; each fault signal comprises a time that a computing device encountered a fault, an identifier of the computing device that encountered the fault, a type associated with the fault, and an error code associated with the fault; and the device type information comprises a set of attributes, wherein each attribute may be assigned a value from a corresponding set of values.

In an embodiment, the correlation score for a given combination of software component, fault and device type is calculated as a weighted sum of time-based correlation scores for the given combination of software component, fault and device type, wherein each time-based correlation score is obtained by comparing a number of computing devices of the device type of the given combination that encountered the fault of the given combination a different number of hours after deployment of the software component of the given combination to a baseline number of faults.

In an embodiment, a first time-based correlation score of the time-based correlation scores calculated for a first number of hours after deployment of the software component is weighted more heavily than a second time-based correlation score of the time-based correlation scores calculated for a second number of hours after deployment of the software component, the first number of hours being less than the second number of hours.

In an embodiment, the baseline number of faults comprises a number of computing devices of the device type of the given combination that encountered the fault of the given combination a certain number of hours before deployment of the software component of the given combination.

In an embodiment, rendering a decision to proceed or not proceed with a future deployment of the software component to additional computing devices comprises: for each combination of fault, software component to which the fault is attributed, and device type, rendering a decision to proceed or not proceed with the future deployment of the software component based on the number of computing devices impacted by one or more faults attributed to the software component; for each combination of software component to which a fault has been attributed and device type, rendering a decision to proceed or not proceed with the future deployment of the software component based on whether a decision to not proceed with the deployment was rendered for any fault associated with the combination; and for each software component to which a fault has been attributed, rendering a decision to proceed or not proceed with the future deployment of the software component based on whether a decision to not proceed with the future deployment was rendered for any device type associated with the software component to which the fault has been attributed.

In an embodiment, a first time-based correlation score of the time-based correlation scores calculated for a first number of hours after deployment of the software component is weighted more heavily than a second time-based correlation score of the time-based correlation scores calculated for a second number of hours after deployment of the software component, the first number of hours being less than the second number of hours.

In an embodiment, the baseline number of faults comprises a number of computing devices of the device type of the given combination that encountered the fault of the given combination a certain number of hours before deployment of the software component of the given combination.

In an embodiment, rendering a decision to proceed or not proceed with a future deployment of the software component to additional computing devices comprises: for each combination of fault, software component to which the fault is attributed, and device type, rendering a decision to proceed or not proceed with the future deployment of the software component based on the number of computing devices impacted by one or more faults attributed to the software component; for each combination of software component to which a fault has been attributed and device type, rendering a decision to proceed or not proceed with the future deployment of the software component based on whether a decision to not proceed with the deployment was rendered for any fault associated with the combination; and for each software component to which a fault has been attributed, rendering a decision to proceed or not proceed with the future deployment of the software component based on whether a decision to not proceed with the future deployment was rendered for any device type associated with the software component to which the fault has been attributed.

In an embodiment, rendering the decision to proceed or not proceed with the future deployment of the software component based on the number of computing devices impacted by one or more faults attributed to the software component comprises comparing the number of computing devices impacted to a historical threshold.

Conclusion

In accordance with an embodiment, any combination of the above-described embodiments may be utilized depending on the system being implemented While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:
1. A method, comprising:
obtaining deployment signals comprising information relating to deployments of software components to a plurality of computing devices;
obtaining fault signals comprising information relating to faults encountered by the plurality of computing devices;
obtaining device type information that describes a device type of each of the plurality of computing devices;
based on the deployment signals, fault signals, and device type information, obtaining a correlation score for each combination of software component, fault, and device type;
based on the correlation scores, attributing each fault occurring on computing devices having a given device type to a particular software component having a highest correlation score; and
for each software component to which a fault is attributed, rendering a decision to proceed or not proceed with a future deployment of the software component to additional computing devices based at least on a number of computing devices impacted by one or more faults attributed to the software component.

2. The method of claim 1, wherein each deployment signal comprises a deployment time, an identifier of a deployed software component, a version of the deployed software component, and an identifier of a computing device upon which the deployed software component was deployed;
wherein each fault signal comprises a time that a computing device encountered a fault, an identifier of the computing device that encountered the fault, a type associated with the fault, and an error code associated with the fault;
wherein the device type information comprises a set of attributes, wherein each attribute may be assigned a value from a corresponding set of values.

3. The method of claim 1, wherein the correlation score for a given combination of software component, fault and device type is calculated as a weighted sum of time-based correlation scores for the given combination of software component, fault and device type, wherein each time-based correlation score is obtained by comparing a number of computing devices of the device type of the given combination that encountered the fault of the given combination a different number of hours after deployment of the software component of the given combination to a baseline number of faults.

4. The method of claim 3, wherein a first time-based correlation score of the time-based correlation scores calculated for a first number of hours after deployment of the software component is weighted more heavily than a second time-based correlation score of the time-based correlation scores calculated for a second number of hours after deployment of the software component, the first number of hours being less than the second number of hours.

5. The method of claim 3, wherein the baseline number of faults comprises a number of computing devices of the device type of the given combination that encountered the fault of the given combination a certain number of hours before deployment of the software component of the given combination.

6. The method of claim 1, wherein rendering a decision to proceed or not proceed with a future deployment of the software component to additional computing devices comprises:
for each combination of fault, software component to which the fault is attributed, and device type, rendering a decision to proceed or not proceed with the future deployment of the software component based on the number of computing devices impacted by one or more faults attributed to the software component;
for each combination of software component to which a fault has been attributed and device type, rendering a decision to proceed or not proceed with the future deployment of the software component based on whether a decision to not proceed with the deployment was rendered for any fault associated with the combination; and
for each software component to which a fault has been attributed, rendering a decision to proceed or not proceed with the future deployment of the software component based on whether a decision to not proceed with the future deployment was rendered for any device type associated with the software component to which the fault has been attributed.

7. The method of claim 6, wherein rendering the decision to proceed or not proceed with the future deployment of the software component based on the number of computing devices impacted by one or more faults attributed to the software component comprises comparing the number of computing devices impacted to a historical threshold.

8. A system, comprising:
one or more processing units; and
one or more memory devices coupled to the one or more processing units, the one or more memory devices storing program instructions for execution by the one or more processing units, the program instructions including:
a deployment signal collection component configured to obtain deployment signals comprising information relating to deployments of software components to a plurality of computing devices;
a fault signal collection component configured to obtain fault signals comprising information relating to faults encountered by the plurality of computing devices;
a device type collection component configured to obtain device type information that describes a device type of each of the plurality of computing devices;
a correlation scoring component configured to obtain a correlation score for each combination of software component, fault, and device type based on the deployment signals, fault signals, and device type information;
an attribution component configured to attribute, based on the correlation scores, each fault occurring on computing devices having a given device type to a particular software component having a highest correlation score; and
a decision component configured to render a decision to proceed or not proceed with a future deployment of the software component to additional computing devices based at least on a number of computing devices impacted by one or more faults attributed to the software component for each software component to which a fault is attributed.

9. The system of claim 8, wherein each deployment signal comprises a deployment time, an identifier of a deployed software component, a version of the deployed software component, and an identifier of a computing device upon which the deployed software component was deployed;
wherein each fault signal comprises a time that a computing device encountered a fault, an identifier of the computing device that encountered the fault, a type associated with the fault, and an error code associated with the fault;
wherein the device type information comprises a set of attributes, wherein each attribute may be assigned a value from a corresponding set of values.

10. The system of claim 8, wherein the correlation scoring component is configured to obtain a correlation score for a given combination of software component, fault and device type by calculating a weighted sum of time-based correlation scores for the given combination of software component, fault and device type, wherein each time-based correlation score is obtained by comparing a number of computing devices of the device type of the given combination that encountered the fault of the given combination a different number of hours after deployment of the software component of the given combination to a baseline number of faults.

11. The system of claim 10, wherein a first time-based correlation score of the time-based correlation scores calculated for a first number of hours after deployment of the software component is weighted more heavily than a second time-based correlation score of the time-based correlation scores calculated for a second number of hours after deployment of the software component, the first number of hours being less than the second number of hours.

12. The system of claim 10, wherein the baseline number of faults comprises a number of computing devices of the device type of the given combination that encountered the fault of the given combination a certain number of hours before deployment of the software component of the given combination.

13. The system of claim 8, wherein the decision component is configured to render the decision to proceed or not proceed with the future deployment of the software component by:
for each combination of fault, software component to which the fault is attributed, and device type, rendering a decision to proceed or not proceed with the future deployment of the software component based on the number of computing devices impacted by one or more faults attributed to the software component;
for each combination of software component to which a fault has been attributed and device type, rendering a decision to proceed or not proceed with the future deployment of the software component based on whether a decision to not proceed with the deployment was rendered for any fault associated with the combination; and
for each software component to which a fault has been attributed, rendering a decision to proceed or not proceed with the future deployment of the software component based on whether a decision to not proceed with the future deployment was rendered for any device type associated with the software component to which the fault has been attributed.

14. A computer program product comprising a computer-readable storage device having computer program logic recorded thereon that when executed by a processor-based computer system causes the processor-based system to perform a method, the method comprising:
obtaining deployment signals comprising information relating to deployments of software components to a plurality of computing devices;
obtaining fault signals comprising information relating to faults encountered by the plurality of computing devices;
obtaining device type information that describes a device type of each of the plurality of computing devices;
based on the deployment signals, fault signals, and device type information obtaining a correlation score for each combination of software component, fault, and device type;
based on the correlation scores, attributing each fault occurring on computing devices having a given device type to a particular software component having a highest correlation score; and
for each software component to which a fault is attributed, rendering a decision to proceed or not proceed with a future deployment of the software component to additional computing devices based at least on a number of computing devices impacted by one or more faults attributed to the software component.

15. The computer program product of claim 14, wherein each deployment signal comprises a deployment time, an identifier of a deployed software component, a version of the deployed software component, and an identifier of a computing device upon which the deployed software component was deployed;

wherein each fault signal comprises a time that a computing device encountered a fault, an identifier of the computing device that encountered the fault, a type associated with the fault, and an error code associated with the fault;

wherein the device type information comprises a set of attributes, wherein each attribute may be assigned a value from a corresponding set of values.

16. The computer program product of claim 14, wherein the correlation score for a given combination of software component, fault and device type is calculated as a weighted sum of time-based correlation scores for the given combination of software component, fault and device type, wherein each time-based correlation score is obtained by comparing a number of computing devices of the device type of the given combination that encountered the fault of the given combination a different number of hours after deployment of the software component of the given combination to a baseline number of faults.

17. The computer program product of claim 16, wherein a first time-based correlation score of the time-based correlation scores calculated for a first number of hours after deployment of the software component is weighted more heavily than a second time-based correlation score of the time-based correlation scores calculated for a second number of hours after deployment of the software component, the first number of hours being less than the second number of hours.

18. The computer program product of claim 16, wherein the baseline number of faults comprises a number of computing devices of the device type of the given combination that encountered the fault of the given combination a certain number of hours before deployment of the software component of the given combination.

19. The computer program product of claim 14, wherein rendering a decision to proceed or not proceed with a future deployment of the software component to additional computing devices comprises:

for each combination of fault, software component to which the fault is attributed, and device type, rendering a decision to proceed or not proceed with the future deployment of the software component based on the number of computing devices impacted by one or more faults attributed to the software component;

for each combination of software component to which a fault has been attributed and device type, rendering a decision to proceed or not proceed with the future deployment of the software component based on whether a decision to not proceed with the deployment was rendered for any fault associated with the combination; and for each software component to which a fault has been attributed, rendering a decision to proceed or not proceed with the future deployment of the software component based on whether a decision to not proceed with the future deployment was rendered for any device type associated with the software component to which the fault has been attributed.

20. The computer program product of claim 19, wherein rendering the decision to proceed or not proceed with the future deployment of the software component based on the number of computing devices impacted by one or more faults attributed to the software component comprises comparing the number of computing devices impacted to a historical threshold.

* * * * *